US011384417B2

United States Patent
Kuball et al.

(10) Patent No.: US 11,384,417 B2
(45) Date of Patent: Jul. 12, 2022

(54) SULFUROUS METALLIC GLASS FORMING ALLOY

(71) Applicant: Universität des Saarlandes, Saarbrücken (DE)

(72) Inventors: Alexander Kuball, Saarbrücken (DE); Benedikt Bochtler, Nalbach (DE); Oliver Gross, Rehlingen-Siersburg (DE); Ralf Busch, Saarbrücken (DE)

(73) Assignee: Universität des Saarlandes, Saarbrucken (DE)

( * ) Notice: Subject to any disclaimer, the term of this patent is extended or adjusted under 35 U.S.C. 154(b) by 91 days.

(21) Appl. No.: 16/795,986

(22) Filed: Feb. 20, 2020

(65) Prior Publication Data

US 2020/0239987 A1 Jul. 30, 2020

Related U.S. Application Data (63) Continuation of application No. PCT/EP2018/072852, filed on Aug. 24, 2018.

(30) Foreign Application Priority Data

Aug. 25, 2017 (EP) .................... 17001437

(51) Int. Cl.
*C22C 45/10* (2006.01)
*C22C 45/00* (2006.01)
*C22C 1/00* (2006.01)

(52) U.S. Cl.
CPC ............ *C22C 45/003* (2013.01); *C22C 1/002* (2013.01); *C22C 45/10* (2013.01)

(58) Field of Classification Search
None
See application file for complete search history.

(56) References Cited

U.S. PATENT DOCUMENTS

| | | | |
|---|---|---|---|
| 2002/0112790 A1* | 8/2002 | Johnson ................ | B22D 13/04 148/508 |
| 2009/0139612 A1* | 6/2009 | Lu ......................... | C22C 45/10 148/538 |
| 2009/0162629 A1 | 6/2009 | Demetriou et al. | |
| 2013/0048152 A1 | 3/2013 | Na et al. | |
| 2014/0116579 A1 | 5/2014 | Na et al. | |
| 2020/0335231 A1* | 10/2020 | Middleburgh ........... | G21C 3/07 |

FOREIGN PATENT DOCUMENTS

| | | |
|---|---|---|
| CN | 1016271 | 4/1992 |
| CN | 105177469 A | 12/2015 |
| DE | 1245139 B | 7/1967 |
| DE | 225721 A1 | 8/1985 |
| DE | 3243964 C2 | 11/1988 |
| EP | 1522602 | 4/2005 |

(Continued)

OTHER PUBLICATIONS

Chinese Office Action dated May 7, 2021 for Application No. 201880055303, 5 pages.

(Continued)

*Primary Examiner* — George Wyszomierski
(74) *Attorney, Agent, or Firm* — Frost Brown Todd LLC (57) ABSTRACT

A sulfurous, metallic glass forming alloy and a method for the production thereof are described.

14 Claims, 4 Drawing Sheets (56) References Cited

FOREIGN PATENT DOCUMENTS

EP     2894236      5/2016
JP     2017034091   2/2020

OTHER PUBLICATIONS

Hostert, C., et al. "Quantum mechanically guided design of Co43Fe20Ta5. 5X31.5 (X= B, Si, P, S) metallic glasses." *Journal of Physics: Condensed Matter* 24.17 (2012): 175402.
International Search Report and Written Opinion dated Oct. 22, 2018 for International Application No. PCT/EP2018/072852, 10 pages.

* cited by examiner

SULFUROUS METALLIC GLASS FORMING ALLOY

FIELD OF THE INVENTION

The present invention relates to sulfurous alloys that form metallic glass and a method for the production thereof.

BACKGROUND OF THE INVENTION

Metallic glasses or amorphous metallic alloys have become increasingly important in recent years due to their excellent mechanical properties. Alloys have been discovered that form massive metallic glasses, that are extremely resistant to corrosion, and with which the necessary cooling speeds for obtaining an amorphous structure can be significantly reduced. For this, the addition of phosphorus to the metal alloys has proven to be very advantageous, see e.g. US 2013/0048152 A1 and US 2014/0116579 A1.

In contrast, sulfurous metal alloys have received much less attention. DE 1 245 139 C2 discloses metal alloys for producing permanent magnets that can contain up to 1% sulfur by weight, which are crystalline instead of amorphous, because they are not quickly cooled, but instead are sintered. DE 32 43 964 describes amorphous metal alloys for producing nibs for writing instruments, which can contain sulfur, but without concretely mentioning sulfurous alloys or sulfur portions. DD 225 721 A1 discloses starting particles produced through melt metallurgy comprised of Ni—C—S with a sulfur content of 0.02%-0.15% by mass, which is produced via an Ni—S master alloy with preferably 10%-20% sulfur by mass. US 2009/0162629 A1 describes sulfurous amorphous metal alloys that have a very high palladium content, which can also contain phosphorus as a non-metal.

A main disadvantage in using phosphorus in metallic glasses is the formation of poisonous white phosphorus during the production. Furthermore, the storage and processing is problematic due to the high flammability and accompanying risk of explosion. Elemental phosphorus does not have a stable molten phase at normal pressure, thus resulting in direct sublimation, making it more difficult to produce the master alloy.

It has been surprisingly discovered that in numerous different metallic glass forming alloys, sulfur can be used entirely or partially in place of phosphorus while maintaining the good mechanical and glass-forming properties, and reducing or preventing the disadvantages mentioned above. In addition, numerous entirely novel sulfurous alloy systems could be produced amorphously.

SUMMARY OF THE INVENTION

Accordingly, a first aspect of the invention relates to a sulfurous, metallic glass forming alloy with the following formula:

$$(Ti,Zr,Nb,Hf,Fe_{(1)},A_{a1})_a Pd_b(Cu,Ni)_c(V,Mo,Ta,W)_d (Co,Cr,Fe_{(2)})_e(Mn,Al,In,Ga,Ag,Si,Ge)_f Sn_g Be_h (B,C)_i(O,H,N)_j(P,S_{x1})_x \quad (I)$$

where:
a=0%-approx. 15% by weight or approx. 30%-approx. 90% by weight,
b=0%-approx. 68% by weight, and
a+b=approx. 30%-approx. 90% by weight,
wherein, when a=0%-approx. 15% by weight, b=approx. 35%-68% by weight,
A is one or more elements from the group of rare earths (lanthanide+yttrium), wherein a1/a=0-approx. 1/10,
c=0%-approx. 65% by weight,
d=0%-approx. 15% by weight,
e=0%-approx. 15% by weight
f=0%-approx. 15% by weight
g=0%-approx. 23% by weight
h=0%-approx. 1% by weight
i=0%-approx. 3.5% by weight, and
j=0%-approx. 0.20% by weight
wherein, when b=0, a and at least one of c and e>0, and when a=0%-approx. 15% by weight and b=approx. 35%-approx. 68% by weight, at least one of c, d, e, f, g>0, and
$Fe_{(1)}$ and $Fe_{(2)}$ each represent Fe, wherein $Fe_{(2)}$ is only present when a=0, x=approx. 0.21-approx. 9% by weight, when a=approx. 30%-90% by weight, and x=approx. 8%-16.5% by weight, when a=0%-approx. 15% by weight and b> approx. 35% by weight, and
x1/x=approx. 1/10 to approx. 1, and
the sum of all percentages, a+b+c+d+e+f+g+h+i+j+x+ unavoidable impurities in trace amounts of elements not contained in the formula (I)=100% by weight,
wherein at least when x1/x=approx. 1 and x=approx. 0.21%-1% by weight, alloys that contain $Fe_{(1)}$, Ni and Al are at least approx. 50% amorphous by volume at a thickness of ≥approx. 20 μm.

The invention also relates to a method for producing the above alloy, in which
one or more of the elements Fe, Pd, Ni, Cr, Cu and Co are individually heated and alloyed with sulfur in an appropriate container, and optionally heated and alloyed individually in a separate container with phosphorus,
the resulting alloy(s), if necessary, are subjected to a flux process for purification with $B_2O_3$, and the excess $B_2O_3$ and the non-sulfide and/or non-phosphide impurities are separated from the resulting highly purified sulfide and/or phosphorus alloy, and
the highly purified sulfur alloy, potentially together with the highly purified phosphorus alloy, is melted and alloyed with the remaining elements of the alloy in the highly purified form, and potentially with more Fe, Pd, Ni, Cr, Cu and/or Co in a highly purified form in a suitable oven in an argon atmosphere, and
if a metallic glass is to be formed, subsequently subjected to a fast cooling.

BRIEF DESCRIPTION OF THE FIGURES

The FIGS. 1, 3, 5 and 7 show thermograms of the alloys produced in examples 1-5.

DETAILED DESCRIPTION

The alloy formula given in the summary of the invention comprises numerous groups of elements, wherein each element within parentheses can be present in an alloy according to the invention, either alone or in combination with other elements within the parentheses. The subscript letters following parentheses each represent a range of percentages by weight, which is the sum of all of the percentages by weight of the elements within the parentheses.

The Following Specifics Apply:

Fe appears as $Fe_{(1)}$ and $Fe_{(2)}$ in two different sets of parentheses in the formula, wherein $Fe_{(2)}$ is only present when $Fe_{(1)}$ is not. This unconventional form of notation was necessary in order to indicate in a compact manner the necessary presence of alloy elements that can be implemented in a master alloy with either sulfur or phosphorus.

The letter A represents rare earth elements (lanthanide+yttrium), the total weight of which is a maximum of 10% or one tenth of the weight of all of the elements in these parentheses. The person skilled in the art knows that a proportionally limited replacement of the elements Ti, Zr, Nb, Hf, Fe in the first parentheses with rare earth metals (lanthanides and yttrium) improves the glass formation properties.

It is also the case that when the percentages by weight a of Ti, Zr, Nb, Hf, Fe, and A in the first parentheses are 0%-approx. 15% by weight, the percentage by weight b of the element Pd is high, i.e. > approx. 30%-approx. 68% by weight. Pd can entirely or partially replace the elements Ti, Zr, Nb, Hf, Fe and A, depending on its amount. The overall percentage by weight of a+b is approx. 30%-approx. 97% by weight.

All of the alloys contain at least two metals. At least one of the metals that can easily form a master alloy with sulfur or phosphorus must be present. These are Pd with the percentage by weight b, Cu and Ni with the percentage by weight c, and Co, Cr, and Fe with the percentage by weight e.

The overall percentage by weight x of the elements P and S depends on the ratios of the quantities of the elements Ti, Zr, Nb, Hf, Fe and A to the element Pd. When the elements Ti, Zr, Nb, Hf, Fe and A are only present in an overall percentage a of 0%-15% by weight, and the percentage b of Pd is accordingly approx. 35%-approx. 68% by weight, the overall percentage by weight x of P and S is relatively high, i.e. approx. 8%-approx. 16.5%, and preferably approx. 9% or approx. 10%-approx. 68% by weight. When the overall percentage a of Ti, Zr, Nb, Hf, Fe and A is high, i.e. approx. 30%-approx. 90% by weight, and the overall percentage b of Pd is accordingly lower, i.e. 0%-approx. 40% by weight, the overall percentage x of P and S is approx. 0.21%-approx. 9% by weight. The ratio of the percentage by weight x1 of S to the overall percentage by weight x of P and S is in the range of approx. 1/10 to approx. 1. It is preferably approx. 1, i.e. there is no phosphorus in the alloy in this case.

When x1/x=approx. 1 and x=approx. 0.21%-approx. 1% by weight, alloys that contain $Fe_{(1)}$, Ni and Al are at least 50% by volume amorphous at a thickness of ≤approx. 20 μm. In other cases, thus in addition to the alloy formula described in the first aspect in the summary, and in each of the cases of alloys with a preferred alloy formula given below, they can be present in the amorphous, partially amorphous (e.g. at least approx. 50% by volume amorphous at a thickness of ≤approx. 20 μm) or crystalline form.

The percentages by weight f, g, h, i and j of the remaining elements of the alloy require no special explanation, with the exception of j, the percentage of Be, which is preferably 0% by weight, because Be is known to be toxic.

Further preferred groups of alloys according to the invention shall be explained below.

One preferred alloy has the formula $(Ti, Zr, Nb)_a Pd_b (Cu, Ni)_c Al_f Sn_g (P, S_{x1})_x$, in which a=approx. 30%-approx. 90% by weight, b=0%-approx. 40% by weight, a+b=approx. 30%-approx. 97% by weight, c, f, g, x1, x and the sum of all of the percentages by weight are defined as in the summary in the first aspect of the invention, and at least one of b and c>0% by weight.

Another preferred alloy has the formula $(Ti, Zr, Nb, Hf, Fe_{(1)}, A_{a1})_a Pd_b (Cu, Ni)_c (V, Mo, TA, W)_d (Co, Cr, Fe_{(2)})_e (Mn, Al, In, Ga, Ag, Si, Ge)_f Sn_g (B, C)_h (O, H, N)_i (P, S_{x1})_x$, in which a=0%-approx. 15% by weight, b=> approx. 35%-approx. 68% by weight, and the remaining percentages by weight and other boundary conditions are defined as in the summary in the first aspect of the invention.

Another preferred alloy has the formula $$Nb_a Pd_b (Cu, Ni)_c Cr_e (P, S_{x1})_x$$

in which a=approx. 41%-approx. 59% by weight, x=approx. 0.5%-approx. 3.5% by weight, x1/x=approx. 1, c=approx. 35%-approx. 65% by weight, preferably c=approx. 40%-approx. 55% by weight, e=0%-approx. 1.5% by weight, and the remaining percentage by weight and other boundary conditions as well as the sum of all of the percentages by weight are defined as in the summary in the first aspect of the invention.

The alloy with the formula $$(Zr, Fe_{(1)})_a (Ni)_c (Mo)_d Cr_e (B, C)_i (P, S_{x1})_x$$

in which a=approx. 62%-approx. 79% by weight, preferably approx. 65%-approx. 79% by weight, c=0%-approx. 22% by weight, d=0% to approx. 15% by weight, e=0%-approx. 6% by weight, wherein c+d+e=approx. 13%-approx. 24% by weight, x=approx. 0.3%-approx. 8.5% by weight, preferably approx. 0.5%-approx. 8.5% by weight, x1/x and i and the other boundary conditions as well as the sum of all percentages by weight are defined as in the summary in the first aspect of the invention, is likewise preferred.

Lastly, an alloy with the formula $$((Nb, Hf)_a Pd_b (Cu, Ni)_c (Fe_{(2)}, Co)_e (P, S_{x1})_x$$

is also preferred, in which a=0%-approx. 15% by weight, particularly preferably a=0% by weight, b=approx. 35%-approx. 68% by weight, c, e, x and x1 and the sum of all of the percentages by weight are defined as in the summary in the first aspect of the invention, wherein it is particularly preferred that x1/x=approx. 1, and when a=0% by weight, at least one of c and e>0% by weight.

Table 1 shows concrete alloy examples that are produced using the general method guidelines below, wherein a fast cooling is obtained by pouring it into a cooled copper mold. All of these alloys are at least approx. 50% amorphous at a thickness of 250 μm. The person skilled in the art knows that in such a case, in which an efficient fast cooling method is used, e.g. a melt spinning process, 100% amorphous alloys (metallic glasses) can be obtained.

Because of the amorphous structure, the alloys are harder, more elastic, and more rigid than their crystalline counterparts. By way of example, alloy No. 276 in Table 1 has a hardness of 566 HV5, and elasticity of more than 2% and a bending strength of approx. 3 GPa.

For the production of alloys, the purity of the starting materials must be such that the quantities of all of the elements described above in the summary of the invention in the first aspect are maintained. Such materials are referred to as "highly purified" in the following, wherein this expression, as used in this invention, does not necessarily have to mean the same thing as the conventional definition of "highly purified." The person skilled in the art knows, of course, that alloys may unavoidably contain trace impurities. Accordingly, the sum of all percentages by weight in the alloys according to the invention a+b+c+d+e+f+g+h+i+j+x+ unavoidable impurities in trace amounts of elements not contained in the formula (I)=100% by weight. Trace amounts in this context conventionally means a total amount of typically metallic and potentially also semi-metallic impurities of ≤approx. 0.1% by weight, preferably ≤approx. 0.075% by weight, more preferably ≤approx. 0.05% by weight, particularly preferably ≤approx. 0.03% by weight, more particularly preferably ≤approx. 0.01% by weight, very particularly preferably ≤approx. 0.005% by weight, and most preferably ≤approx. 0.001% by weight.

In the general method for producing the alloys according to the invention, one or more master alloys are produced from Fe, Pd, Ni, Cr, Cu or Co with sulfur, and potentially one or more master alloys are produced from Fe, Pd, Ni, Cr, Cu or Co with phosphorus. The metal and sulfur or phosphorus are heated and alloyed under an inert gas, preferably argon, in a heat resistant container (e.g. made of quartz glass). The heating and alloying is preferably carried out through approx. 1 to approx. 10 minutes inductive heating at approx. 50°-approx. 100° C. above the melting point of the component of the alloy that melts at the highest temperature.

If highly purified (as defined above) elements are not used for the master alloy, the master alloy can be subjected to a flux process with $B_2O_3$ to purify it. The raw master alloy is melted in inert gas, preferably argon, with 5%-15% $B_2O_3$ by weight and kept for approx. 2-approx. 24 hours, preferably approx. 4 hours at a temperature of approx. 1000° to approx. 1300° C., preferably at least approx. 100° C. above the melting point of the alloy. The non-sulfide and/or non-phosphide impurities are absorbed in the $B_2O_3$ melt, because this results in a reduction in the free energy of the overall system.

After cooling to room temperature, the excess $B_2O_3$ containing the impurities located on top of the alloy is dissolved or dispersed in water and poured off therewith, leaving a highly purified master alloy.

The highly purified (as defined above) sulfurous alloy(s) are melted and alloyed, potentially with the highly purified (as defined above) phosphorus alloy(s), along with the remaining elements of the alloy, which are likewise used in their highly purified forms (as defined above), and potentially with more Fe, Pd, Ni, Cr, Cu and/or Co, likewise in the highly purified form (as defined above), in a suitable oven, in inert gas, preferably argon, in a vacuum. This preferably takes place in an electric arc furnace, wherein the alloy is melted for a total of approx. 30-180 seconds in an electric arc furnace at approx. 1000°-approx. 2000° C., preferably approx. 500° C. above the melting point of the component with the highest melting point. The implementation of multiple, approx. 30 second melting periods, with subsequent turning of the alloy, is preferred for this.

In order to produce amorphous or partially amorphous alloys (metallic glasses)—also referred to herein as (partially) amorphous, meaning that at least approx. 50% by volume is amorphous at a thickness of ≥ approx. 20 μm (wherein thicknesses of ≥ approx. 50 μm are more preferable, thicknesses of ≥ approx. 100 μm are even more preferable, and thicknesses of ≥ approx. 200 μm and even better ≥250 μm are most preferable), and including completely amorphous alloys—the alloy is then subjected to a fast cooling. This can take place, e.g., using a chill casting process, such as a tilting, spinning, suction or die casting in chilled molds, or more efficiently using a melt spinning process or a powdering process, in which the alloy melt is processed to form a powder in a protective gas atmosphere, or through so-called splat quenching.

Molds made of alloys can be produced, e.g., from amorphous alloy powder through thermoplastic molds or cold forming, or from amorphous and/or (partially) crystalline alloy powder through laser beam melting (3D printing).

EXAMPLES

In the following examples, (partially) amorphous means that approx. 50% of the sample by volume is amorphous.

Example 1

Production of the Alloy $Ti_{8.58}Zr_{69.43}Ni_{10.75}Cu_{8.22}S_{3.02}$

1A. Production of the Master Alloy $Ni_{73.3}S_{26.7}$ 21.99 g nickel and 8.01 g sulfur were obtained to produce 30 g of highly purified Ni—S alloy $Ni_{73.3}S_{26.7}$, and alloyed inductively in a quartz glass in argon at a max. of 1500° C. for 5 minutes. The alloy is melted in the subsequent purification process in argon with 3.4 g $B_2O_3$ and kept at 1000° C. for 4 hours. Impurities in the metallic melt are absorbed in the $B_2O_3$ melt in the purification process. After cooling to room temperature, the $B_2O_3$ melt, along with the impurities, is dissolved or dispersed in water, and poured off the master alloy, leaving behind a highly purified alloy.

1B. Implementation of the Master Alloy with the Remaining Alloy Components 15 g of the alloy $Ti_{8.58}Zr_{69.43}Ni_{10.75}Cu_{8.22}S_{3.02}$ are produced by combining 0.3689 g nickel, 10.4145 g zirconium, 1.2870 g titanium, 1.2330 g copper, and 1.6966 g nickel-sulfur alloy with a composition of $Ni_{73.3}S_{26.7}$. The pure elements and the nickel-sulfur alloy are alloyed in argon in an electric arc furnace at approx. 2000° C. The alloying knob is turned at least three times, and the melting is carried out (for approx. 30 seconds) in order to ensure that the alloy is homogeneous.

The production of the (partially) amorphous portion with a thickness of 0.5-1 mm takes place subsequently, through pouring it into copper cooling molds cooled to room temperature.

Figure 1:
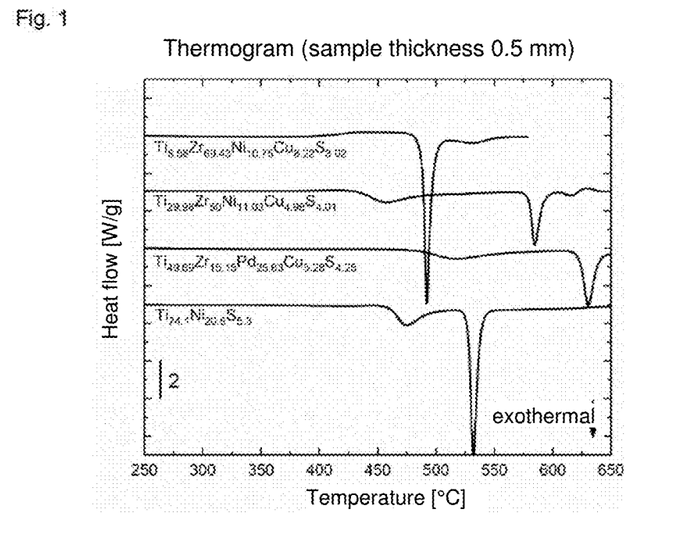

The thermogram for this alloy is shown with a thickness of 0.5 mm in the uppermost curve in FIG. 1. The crystallization point 488° C. and the transition to glass at 398° C. apply to (partially) amorphous structures.

Figure 2:
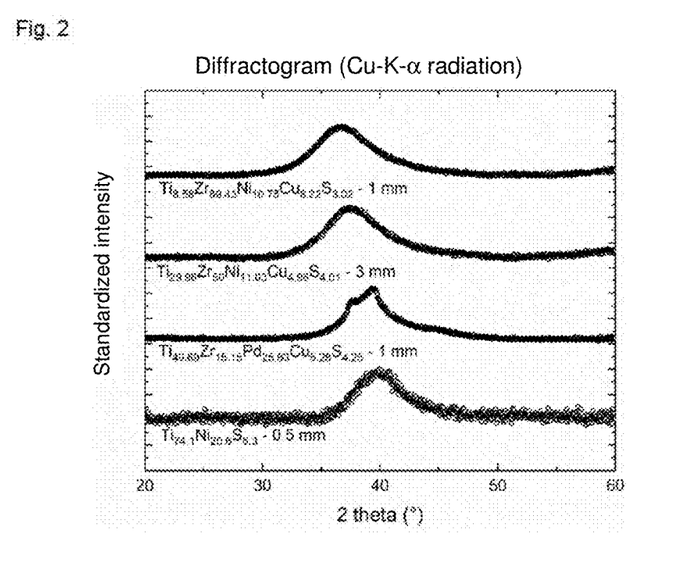
FIGS. 2, 4 and 6 show diffractograms of the alloys produced in examples 1-4.

The diffractogram (Cu—K-α radiation) of this alloy is shown with a thickness of 1 mm in the uppermost curve in the FIG. 2. The wide hump in the curve indicates the (partially) amorphous structure.

Example 2

Production of the Alloy $Ti_{74.1}Ni_{20.6}S_{5.3}$

2A. Production of the Master Alloy $Ni_{69.11}S_{30.89}$

The master alloy $Ni_{69.11}S_{30.89}$ is produced in the same manner as in Example 1A, but with the addition of 13.822 g nickel and 6.178 g sulfur and 2.1 g $B_2O_3$.

2B. Implementation of the Master Alloy with the Remaining Alloy Components 8 g of the alloy $Ti_{74.1}Ni_{20.6}S_{5.3}$ are produced by combining 0.6994 g nickel, 5.9280 g titanium, and 1.3726 g nickel-sulfur alloy that has the composition $Ni_{69.11}S_{30.89}$. The pure elements and the nickel-sulfur alloy are alloyed in argon in an electric arc furnace at approx. 2000° C. The alloying knob is turned at least three times, and the melting is carried out (for approx. 30 seconds) in order to ensure that the alloy is homogeneous.

The production of the (partially) amorphous portion with a thickness of 0.5 mm takes place subsequently, through pouring it into copper cooling molds cooled to room temperature.

The thermogram of this alloy is shown with a thickness of 0.5 mm in the lowest curve in the FIG. 1. The crystallization point at 462° C. and the transition to glass at 423° C. apply to (partially) amorphous structures.

The diffractogram (Cu—K-α radiation) for this alloy is shown with a thickness of 0.5 mm in the lowest curve of the FIG. 2. The wide hump in the curve indicates the (partially) amorphous structure.

FIGS. 1 and 2 also show the thermograms and diffractograms of two other alloys that contain Ti, Zr, Ni, or Pd, Cu and S (alloys Nos. 218 and 248, Table 1, Example 6).

Example 3

Production of Alloy $Pd_{56.71}Ni_{31.28}S_{12.01}$

3A. Production of the Master Alloy $Ni_{69.11}S_{30.89}$

The alloy $Ni_{69.11}S_{30.89}$ is produced in the same manner as in Example 2A.

3B. Production of the Master Alloy $Pd_{86.04}S_{13.96}$ 25.812 g palladium and 4.188 g sulfur were obtained to produce 30 g highly purified Pd—S alloy $Pd_{86.04}S_{13.96}$, and inductively alloyed in a quartz glass in argon at a maximum temperature of 1600° C. for 5 minutes. The alloy is subsequently melted in argon with 2.9 g $B_2O_3$ in the purification process and kept at 1000° C. for 4 hours. Impurities in the metallic melt are absorbed in the $B_2O_3$ melt in the purification process. After cooling to room temperature, the $B_2O_3$ melt, along with the impurities, is dissolved or dispersed in water, and poured off the master alloy, leaving behind a highly purified alloy.

3C. Implementation of the Master Alloy with the Remaining Alloy Components 20 g of the alloy $Pd_{56.71}Ni_{31.28}S_{12.01}$ are produced by combining 3.5693 g nickel, 3.9415 g palladium, 3.8872 g nickel-sulfur alloy that has the composition $Ni_{69.11}S_{13.96}$ and 8.6020 g palladium-sulfur alloy that has the composition $Pd_{86.04}S_{13.96}$. The pure elements, the nickel-sulfur alloy, and the palladium-sulfur alloy are alloyed in argon in an electric arc furnace at approx. 2000° C. The alloying knob is turned at least three times, and the melting is carried out (for approx. 30 seconds) in order to ensure that the alloy is homogeneous.

The production of the (partially) amorphous portion with a thickness of 0.5-1.5 mm takes place subsequently, through pouring it into copper cooling molds cooled to room temperature.

Alternatively, the pure elements, the nickel-sulfur alloy, and the palladium-sulfur alloy can be alloyed in quartz glass.

Figure 3:
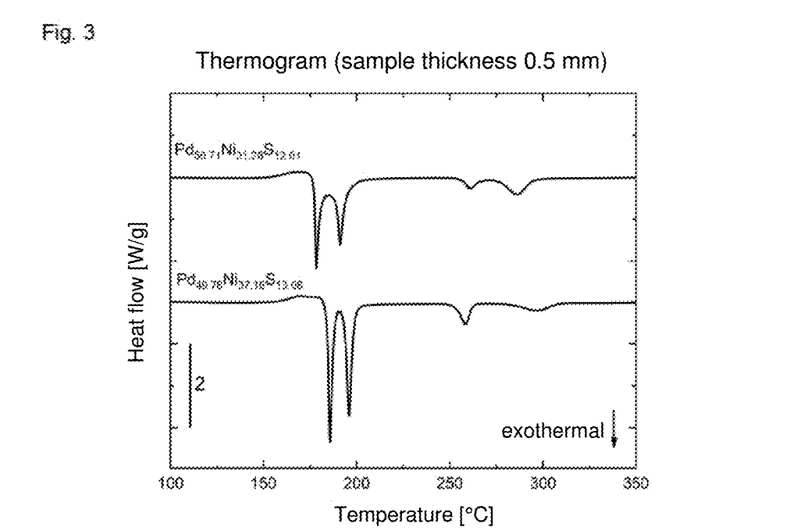

The thermogram for this alloy is shown with a thickness of 0.5 mm in the lowest curve in FIG. 3. The crystallization point at 176.2° C. and the transition to glass at 152.9° C. apply to (partially) amorphous structures.

Figure 4:
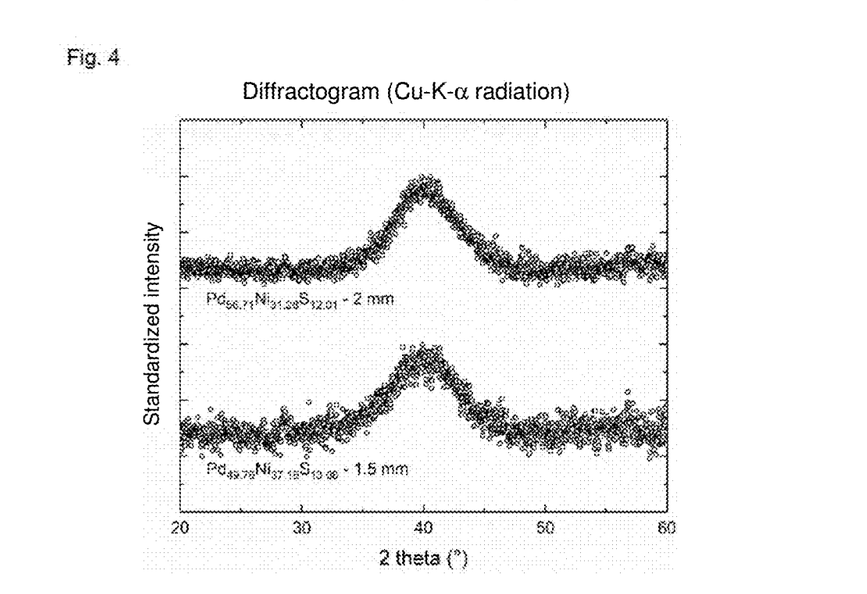

The diffractogram (Cu—K-α radiation) for this alloy is shown with a thickness of 1.5 mm in the lower curve in FIG. 4. The wide hump in the curve indicates the (partially) amorphous structure.

FIGS. 3 and 4 also show thermograms and diffractograms of another alloy in the lower curve, which contains Pd, Ni, and S (alloy No. 56, Table 1, Example 6).

Example 4

Production of Alloy $Nb_{50.76}Ni_{45.22}Cu_{2.67}S_{1.35}$

4A. Production of the Master Alloy $Ni_{69.11}S_{30.89}$

The master alloy $Ni_{69.11}S_{30.89}$ is produced in the same manner as in Example 2A.

4B. Implementation of the Master Alloy with the Remaining Alloy Components 6 g of the alloy $Nb_{50.76}Ni_{45.22}Cu_{2.67}S_{1.35}$ are produced by combining 2.6586 g nickel, 3.1979 g niobium, 0.2753 g nickel-sulfur alloy with the composition $Ni_{69.11}S_{30.89}$ and 0.1682 g copper. The pure elements and the nickel-sulfur alloy are alloyed in argon in an electric arc furnace at approx. 2000° C. The alloying knob is turned at least three times, and the melting is carried out (for approx. 30 seconds) in order to ensure that the alloy is homogeneous.

The production of the (partially) amorphous portion with a thickness of 0.5-3 mm takes place subsequently, through pouring it into copper cooling molds cooled to room temperature.

Figure 5:
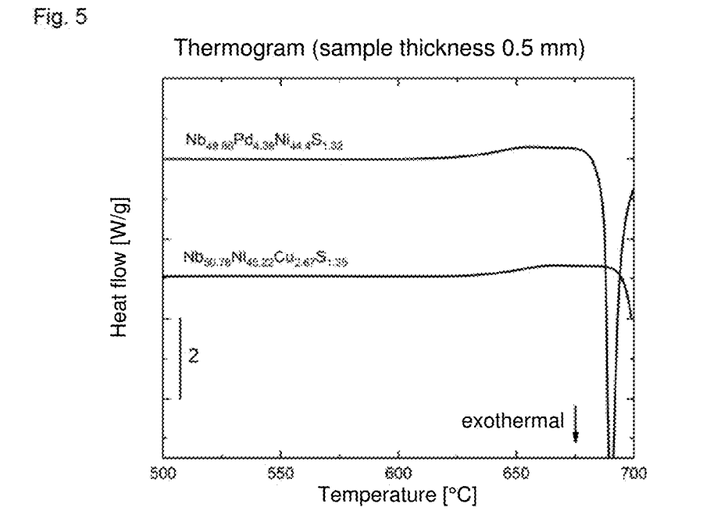

The thermogram for this alloy is shown with a thickness of 0.5 mm in the lower curve in FIG. 5. The crystallization point at 696° C. and the transition to glass at 635° C. apply to (partially) amorphous structures.

Figure 6:
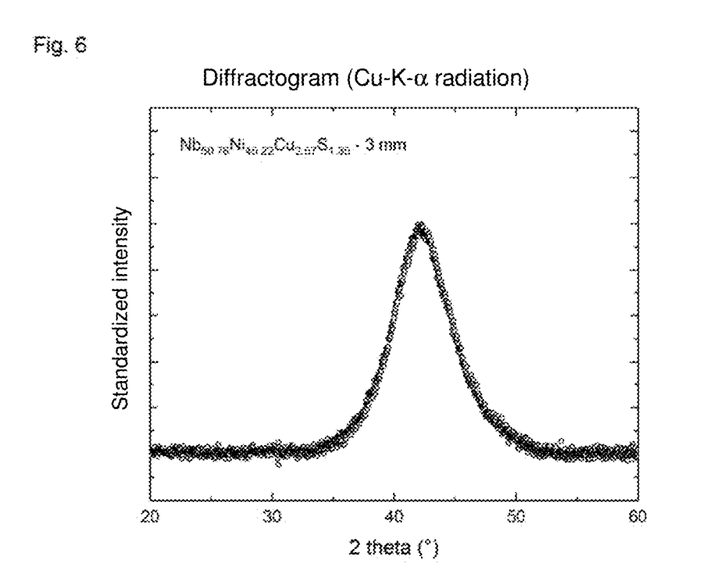

The diffractogram (Cu—K-α radiation) for this alloy is shown with a thickness of 3 mm in FIG. 6. The wide hump in the curve indicates the (partially) amorphous structure.

FIG. 5 also shows the thermogram and diffractogram of another alloy in the upper curve, which contains Nb, Ni, Pd, and S (alloy No. 20, Table 1, Example 6).

Example 5

Production of Alloy $Mo_{10.68}Ni_{6.59}Fe_{69.48}Cr_{3.37}S_{1.25}P_{6.90}B_{0.50}C_{1.23}$ 5A. Production of the Master Alloy $Ni_{84.06}S_{15.94}$ 16.812 g nickel and 3.188 g sulfur are obtained to produce 20 g of the highly purified Ni—S alloy $Ni_{84.06}S_{15.96}$, and inductively alloyed in a quartz glass in argon at a maximum temperature of 1500° C. for 5 minutes. The alloy is subsequently melted in argon with 2.7 g $B_2O_3$ in a purification process, and kept at 1250° C. for 4 hours. Impurities in the metallic melt are absorbed in the $B_2O_3$ melt in the purification process. After cooling to room temperature, the B2O3 melt, along with the impurities, is dissolved or dispersed in water, and poured off the master alloy, leaving behind a highly purified alloy.

5B. Production of Alloy $Fe_{90.97}P_{9.03}$ 22.7425 g iron and 2.2575 g phosphorus are obtained to produce 25 g of the highly purified Fe—P alloy $Fe_{90.97}P_{9.03}$ and inductively alloyed in a quartz glass in argon at a maximum temperature of 1600° C. for 5 minutes. The alloy is subsequently melted in argon with 1.5 g $B_2O_3$ in a purification process, and kept at 1250° C. for 4 hours. Impurities in the metallic melt are absorbed in the $B_2O_3$ melt in the purification process. After cooling to room temperature, the $B_2O_3$ melt, along with the impurities, is dissolved or dispersed in water, and poured off the master alloy, leaving behind a highly purified alloy.

5C. Implementation of the Master Alloy with the Remaining Alloy Components 20 g of the alloy $Mo_{10.68}Ni_{6.59}Fe_{69.48}Cr_{3.37}S_{1.25}P_{6.90}B_{0.50}C_{1.23}$ are produced by combining 2.136 g molybdenum, 0.674 g chromium, 0.246 g carbon, 0.100 g boron, 15.276 g iron-phosphorus alloy with a composition of $Fe_{90.97}P_{9.03}$, and 1.568 g nickel-sulfur alloy with a composition of $Ni_{84.06}S_{15.94}$. The pure elements, the nickel-sulfur alloy, and the iron-phosphorus alloy are alloyed in argon in an electric arc furnace at approx. 2000° C. The alloying knob is turned at least three times, and the melting is carried out (for approx. 30 seconds) in order to ensure that the alloy is homogeneous.

The production of the (partially) amorphous portion with a thickness of 0.5 mm takes place subsequently, through pouring it into copper cooling molds cooled to room temperature.

Figure 7:
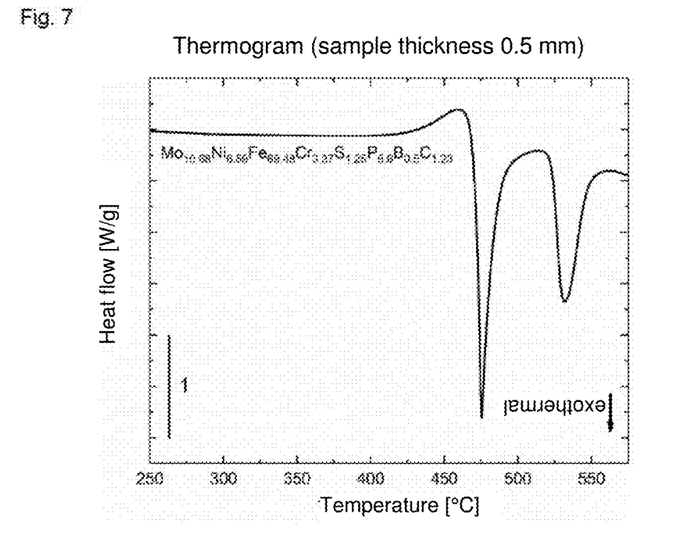

The thermogram for this alloy is shown with a thickness of 0.5 mm in FIG. 7. The crystallization point at 496° C. and the transition to glass at 427° C. applies to (partially) amorphous structures.

Example 6

Further Produced Alloys

Figure 8:
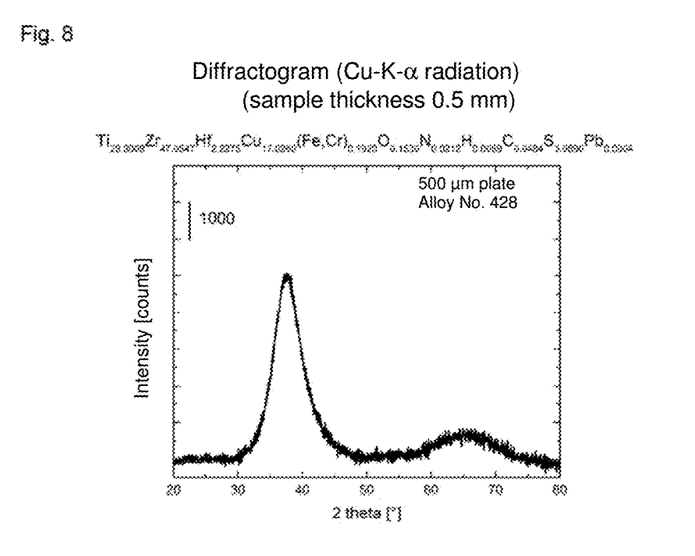
FIG. 8 shows the diffractogram of the alloy Ti29.3009Zr47.0547Hf2.2275Cu17.0260(Fe,Cr) 0.1920O0.0212H0.0069C0.0484S3.9 690 and Pb0.0004 as a metallic trace impurity. It can be derived from the diffractogram that the sample is amorphous.

Further examples are shown in Table 1, which are produced in a manner analogous to that for the Examples 1-5. The alloy 428 is produced without a flux process. FIG. 8 shows the diffractogram for a 0.5 mm thick amorphous sample of this alloy.

TABLE 1

| | |
|---|---|
| 1 | Fe69, 48Mo10, 68Ni6, 59Cr3, 37S1, 25P6, 9B0, 5C1, 23 |
| 2 | Nb41, 94Ni54, 91S3, 15 |
| 3 | Nb43, 48Ni54, 04S2, 48 |
| 4 | Nb44, 97Ni53, 19S1, 84 |
| 5 | Nb46, 43Ni52, 36S1, 21 |
| 6 | Nb47, 67Ni46, 01Cu2, 72Cr2, 22S1, 38 |
| 7 | Nb47, 77Ni48, 62Cr2, 23S1, 38 |
| 8 | Nb47, 85Ni51, 55S0, 6 |
| 9 | Nb48, 11Ni49, 59S2, 3 |
| 10 | Nb48, 34Ni49, 83S1, 83 |
| 11 | Nb48, 57Ni50, 06S1, 37 |
| 12 | Nb48, 71Ni45, 75Cu2, 7Cr1, 47S1, 37 |
| 13 | Nb48, 82Ni48, 34Cr1, 48S1, 36 |
| 14 | Nb48, 8Ni50, 3S0, 9 |
| 15 | Nb49, 02Ni50, 53S0, 45 |
| 16 | Nb49, 51Ni41, 7Cu2, 6Sn4, 87S1, 32 |
| 17 | Nb49, 61Ni44, 2Sn4, 88S1, 31 |
| 18 | Nb49, 74Ni45, 48Cu2, 69Cr0, 73S1, 36 |
| 19 | Nb49, 84Ni48, 06Cr0, 73S1, 37 |
| 20 | Nb49, 86Pd4, 39Ni44, 42S1, 33 |
| 21 | Nb49, 8Ni48, 85S1, 35 |
| 22 | Nb50, 34Ni44, 03Cu2, 65Sn1, 65S1, 33 |
| 23 | Nb50, 42Pd1, 48Ni44, 11Cu2, 65S1, 34 |
| 24 | Nb50, 44Ni46, 57Sn1, 65S1, 34 |
| 25 | Nb50, 52Pd1, 48Ni46, 65S1, 35 |
| 26 | Nb50, 62Ni41, 82Cu6, 21S1, 35 |
| 27 | Nb50, 69Ni43, 52Cu4, 45S1, 34 |
| 28 | Nb50, 76Ni45, 22Cu2, 67S1, 35 |
| 29 | Nb50, 79Ni46, 08Cu1, 78S1, 35 |
| 30 | Nb50, 83Ni46, 93Cu0, 89S1, 35 |
| 31 | Nb50, 86Ni47, 79S1, 35 |
| 32 | Nb50, 91Ni47, 01Cr0, 73S1, 35 |
| 33 | Nb50, 96Ni46, 23Cr1, 46S1, 35 |
| 34 | Nb51, 92Ni46, 74S1, 34 |
| 35 | Nb52, 96Ni45, 7S1, 34 |
| 36 | Nb54, 1Ni43, 13Cr1, 44S1, 33 |
| 37 | Nb54Ni44, 67S1, 33 |
| 38 | Nb55, 07Ni42, 88Cr0, 72S1, 33 |
| 39 | Nb55, 85Ni38, 49Cu4, 34S1, 32 |
| 40 | Nb55, 93Ni40, 15Cu2, 61S1, 31 |

TABLE 1-continued

| | |
|---|---|
| 41 | Nb55, 96Ni40, 98Cu1, 74S1, 32 |
| 42 | Nb56, 04Ni42, 64S1, 32 |
| 43 | Nb56, 09Ni41, 88Cr0, 71S1, 32 |
| 44 | Nb56, 14Ni41, 11Cr1, 43S1, 32 |
| 45 | Nb56, 19Ni40, 34Cr2, 14S1, 33 |
| 46 | Nb56Ni41, 81Cu0, 87S1, 32 |
| 47 | Nb58, 04Ni40, 65S1, 31 |
| 48 | Pd35, 33Ni48, 71S15, 96 |
| 49 | Pd47, 04Ni40, 26S12, 7 |
| 50 | Pd48, 5Ni38, 34S13, 16 |
| 51 | Pd49, 54Ni31, 73Cu5, 73S13 |
| 52 | Pd49, 61Ni33, 54Cu3, 82S13, 03 |
| 53 | Pd49, 69Ni35, 36Cu1, 91S13, 04 |
| 54 | Pd49, 75Ni33, 64Co3, 56S13, 05 |
| 55 | Pd49, 76Ni35, 41Co1, 78S13, 05 |
| 56 | Pd49, 76Ni37, 18S13, 06 |
| 57 | Pd49, 85Ni33, 7Fe3, 38S13, 07 |
| 58 | Pd49, 89Ni31, 95Fe5, 07S13, 09 |
| 59 | Pd49, 8Ni35, 44Fe1, 69S13, 07 |
| 60 | Pd50, 4Ni38, 22S11, 38 |
| 61 | Pd52, 22Ni34, 91S12, 87 |
| 62 | Pd52, 61Ni35, 08S12, 31 |
| 63 | Pd53, 42Ni33, 8S12, 78 |
| 64 | Pd53, 98Ni34, 87S11, 15 |
| 65 | Pd54, 1Ni29, 84S16, 06 |
| 66 | Pd55, 26Ni30, 47S14, 27 |
| 67 | Pd56, 36Ni31, 08S12, 56 |
| 68 | Pd56, 71Ni31, 28S12, 01 |
| 69 | Pd56, 77Ni31, 31S9, 02P2, 9 |
| 70 | Pd56, 83Ni31, 34S6, 02P5, 81 |
| 71 | Pd56, 89Ni31, 37S3, 01P8, 73 |
| 72 | Pd56Ni30, 88S13, 12 |
| 73 | Pd57, 06Ni32, 47S11, 47 |
| 74 | Pd57, 37Ni29, 08S13, 55 |
| 75 | Pd57, 41Ni31, 66S10, 93 |
| 76 | Pd58, 97Ni29, 19S11, 84 |
| 77 | Pd59, 19Ni28, 46S12, 35 |
| 78 | Pd60, 85Ni26, 93S12, 22 |
| 79 | Pd67, 92Ni21, 85S10, 23 |
| 80 | Ti0, 68Nb49, 87Ni48, 09S1, 36 |
| 81 | Ti1, 9Zr66, 86Ni11, 5Cu15, 24Al3, 62S0, 88 |
| 82 | Ti2, 55Zr66, 6Ni16, 26Cu10, 84Al2, 87S0, 88 |
| 83 | Ti2, 56Zr65, 67Ni11, 51Cu16, 12Al3, 26S0, 88 |
| 84 | Ti2, 56Zr65, 76Ni13, 14Cu14, 4Al3, 26S0, 88 |
| 85 | Ti2, 57Zr65, 85Ni14, 77Cu12, 67Al3, 26S0, 88 |
| 86 | Ti2, 57Zr65, 94Ni16, 4Cu10, 94Al3, 27S0, 88 |
| 87 | Ti2, 57Zr66, 01Ni11, 57Cu15, 33Al3, 64S0, 88 |
| 88 | Ti2, 59Zr65, 26Ni16, 55Cu11, 03Al3, 67S0, 9 |
| 89 | Ti3, 04Zr81, 04Ni12, 66S3, 26 |
| 90 | Ti3, 18Zr61, 97Hf2, 94Ni11, 63Cu15, 43Fe0, 14Al3, 66S0, 88C0, 04O0, 11N0, 02 |
| 91 | Ti3, 19Zr63, 88Ni11, 43Cu15, 18Al3, 6S2, 72 |
| 92 | Ti3, 19Zr65, 12Ni11, 65Cu15, 46Fe0, 01Al3, 67S0, 89O0, 01 |
| 93 | Ti3, 22Zr64, 49Ni11, 54Cu15, 31Al3, 63S1, 81 |
| 94 | Ti3, 24Zr61, 93Hf2, 96Ni11, 62Cu15, 42Fe0, 13Al3, 66S0, 89C0, 03O0, 1N0, 02 |
| 95 | Ti3, 24Zr64, 79Ni11, 59Cu15, 39Al3, 65S1, 34 |
| 96 | Ti3, 24Zr64, 81Ni11, 58Cu16, 22Al3, 28S0, 87 |
| 97 | Ti3, 24Zr64, 87Ni11, 61Cu15, 41Al3, 65S1, 22 |
| 98 | Ti3, 24Zr64, 97Ni11, 61Cu15, 82Al3, 47S0, 89 |
| 99 | Ti3, 25Zr60, 15Hf2, 83Nb1, 9Ni11, 62Cu15, 42Fe0, 13Al3, 66S0, 89C0, 03O0, 1N0, 02 |
| 100 | Ti3, 25Zr64, 94Ni11, 62Cu15, 42Al3, 66S1, 11 |
| 101 | Ti3, 25Zr65, 01Ni11, 63Cu15, 44Al3, 66S1, 01 |
| 102 | Ti3, 25Zr65, 09Ni11, 65Cu15, 46Al3, 67S0, 88 |
| 103 | Ti3, 25Zr65, 16Ni11, 66Cu15, 47Al3, 67S0, 79 |
| 104 | Ti3, 25Zr65, 18Ni12, 46Cu14, 55Al3, 67S0, 89 |
| 105 | Ti3, 26Zr65, 23Ni11, 67Cu15, 49Al3, 68S0, 67 |
| 106 | Ti3, 26Zr65, 23Ni13, 28Cu13, 67Al3, 67S0, 89 |
| 107 | Ti3, 26Zr65, 27Ni14, 11Cu12, 8Al3, 67S0, 89 |
| 108 | Ti3, 26Zr65, 31Ni14, 93Cu11, 93Al3, 68S0, 89 |
| 109 | Ti3, 26Zr65, 36Ni15, 76Cu11, 05Al3, 68S0, 89 |
| 110 | Ti3, 26Zr65, 3Ni11, 67Cu15, 02Al3, 86S0, 89 |
| 111 | Ti3, 27Zr65, 45Ni17, 42Cu9, 29Al3, 68S0, 89 |
| 112 | Ti3, 27Zr65, 47Ni11, 7Cu14, 61Al4, 06S0, 89 |
| 113 | Ti3, 27Zr65, 4Ni16, 59Cu10, 17Al3, 68S0, 89 |
| 114 | Ti3, 28Zr65, 64Ni11, 73Cu14, 2Al4, 26S0, 89 |
| 115 | Ti3, 94Zr64, 26Ni11, 71Cu15, 51Al3, 69S0, 89 |
| 116 | Ti4, 43Zr39, 83Cu45, 4Ag8, 56S1, 78 |
| 117 | Ti4, 47Zr40, 19Cu45, 82Ag8, 64S0, 88 |

TABLE 1-continued

| | |
|---|---|
| 118 | Ti4, 64Zr63, 37Ni11, 78Cu15, 61Al3, 71S0, 89 |
| 119 | Ti5, 34Zr62, 47Ni11, 85Cu15, 7Al3, 73S0, 91 |
| 120 | Ti5, 75Zr71, 21Ni10, 34Cu7, 88Al1, 47S3, 35 |
| 121 | Ti5, 83Zr72, 27Ni10, 5Cu8S3, 4 |
| 122 | Ti5, 86Zr72, 65Ni10, 51Cu8, 03S2, 95 |
| 123 | Ti5, 86Zr72, 65Ni5, 81Cu13, 17S2, 51 |
| 124 | Ti5, 87Zr72, 76Ni7, 66Cu11, 2S2, 51 |
| 125 | Ti5, 89Zr72, 93Ni10, 6Cu8, 07S2, 51 |
| 126 | Ti5, 91Zr73, 3Ni10, 61Cu8, 1S2, 08 |
| 127 | Ti5, 98Zr74, 41Ni8, 47Cu6, 39Al1, 45S3, 3 |
| 128 | Ti5, 99Zr73, 86Ni9, 58Cu7, 19S3, 38 |
| 129 | Ti5, 9Zr72, 78Ni9, 44Cu7, 09Al1, 46S3, 33 |
| 130 | Ti6, 05Zr61, 56Ni11, 92Cu15, 8Al3, 76S0, 91 |
| 131 | Ti6, 07Zr75, 5Ni8, 59Cu6, 48S3, 36 |
| 132 | Ti6, 08Zr75, 36Ni7, 46Cu5, 65Al2, 19S3, 26 |
| 133 | Ti6, 13Zr75, 93Ni7, 52Cu5, 7Al1, 44S3, 28 |
| 134 | Ti6, 18Zr76, 49Ni7, 57Cu5, 74Al0, 71S3, 31 |
| 135 | Ti6, 22Zr77, 04Ni7, 63Cu5, 78S3, 33 |
| 136 | Ti6, 25Zr77, 38Ni13, 02S3, 35 |
| 137 | Ti6, 37Zr78, 57Ni6, 67Cu5, 09S3, 3 |
| 138 | Ti6, 45Zr80, 14Ni5, 72Cu4, 4S3, 29 |
| 139 | Ti6, 68Zr38, 21Cu53, 24S1, 87 |
| 140 | Ti6, 75Zr38, 58Cu53, 75S0, 92 |
| 141 | Ti6, 77Zr60, 64Ni12Cu15, 9Al3, 78S0, 91 |
| 142 | Ti7, 08Zr69, 62Ni10, 46Cu7, 97Al1, 48S3, 39 |
| 143 | Ti7, 19Zr70, 67Ni10, 62Cu8, 09S3, 43 |
| 144 | Ti7, 5Zr59, 7Ni12, 07Cu16Al3, 8S0, 93 |
| 145 | Ti8, 24Zr58, 76Ni12, 15Cu16, 1Al3, 83S0, 92 |
| 146 | Ti8, 37Zr67, 45Ni10, 5Cu8Al2, 28S3, 4 |
| 147 | Ti8, 44Zr67, 99Ni10, 58Cu8, 06Al1, 5S3, 43 |
| 148 | Ti8, 57Zr69, 02Ni10, 74Cu8, 19S3, 48 |
| 149 | Ti8, 58Zr69, 43Ni10, 75Cu8, 22S3, 02 |
| 150 | Ti8, 5Zr68, 51Ni10, 66Cu6, 13Al0, 74S3, 46 |
| 151 | Ti8, 62Zr69, 38Ni5, 95Cu13, 48S2, 57 |
| 152 | Ti8, 64Zr69, 49Ni7, 84Cu11, 46S2, 57 |
| 153 | Ti8, 66Zr69, 66Ni10, 85Cu8, 26S2, 57 |
| 154 | Ti8, 67Zr69, 96Ni10, 86Cu8, 38S2, 13 |
| 155 | Ti9, 64Zr73, 51Ni13, 4S3, 45 |
| 156 | Ti8, 5Zr68, 82Cu19, 68S30 |
| 157 | Ti8, 49Zr68, 79Ni10, 64Cu8, 15S3, 94 |
| 158 | Ti5, 68Zr70, 67Ni11, 5Cu8, 73S3, 42 |
| 159 | Ti29, 84Zr48, 34Cu17, 83S40 |
| 160 | Ti30, 19Zr47, 47Cu18, 54S3, 790 |
| 161 | Ti29, 69Zr48, 1Cu18, 72S2, 480 |
| 162 | Ti29, 73Zr49, 58Ni0, 91Cu15, 79S3, 98 |
| 163 | Ti29, 76Zr49, 62Ni1, 82Cu14, 81S3, 99 |
| 164 | Ti29, 78Zr49, 66Ni2, 74Cu13, 84S3, 99 |
| 165 | Ti29, 8Zr49, 69Ni3, 65Cu12, 86S3, 99 |
| 166 | Ti29, 82Zr49, 73Ni4, 57Cu11, 88S4 |
| 167 | Ti29, 21Zr48, 71Cu14, 54Sn3, 62S3, 91 |
| 168 | Ti29, 7Zr48, 12Nb1, 44Cu16, 76S3, 98 |
| 169 | Ti29, 7Zr46, 69Nb2, 88Cu16, 75S3, 98 |
| 170 | Ti29, 9Zr48, 43V0, 8Cu16, 87S4, 01 |
| 171 | Ti30, 09Zr47, 31V1, 6Cu16, 98S4, 03 |
| 172 | Ti29, 88Zr49, 83Cu15, 87Al0, 42S4 |
| 173 | Ti30, 05Zr50, 11Cu14, 96Al0, 85S4, 03 |
| 174 | Ti29, 51Zr49, 21Cu15, 67Ag1, 66S3, 95 |
| 175 | Ti29, 31Zr48, 87Cu14, 59Ag3, 3S3, 93 |
| 176 | Ti57, 77Zr4, 37Ni20, 8Cu14, 61S2, 46 |
| 177 | Ti55, 97Zr6, 57Ni20, 58Cu14, 45S2, 43 |
| 178 | Ti54, 35Zr8, 56Ni20, 38Cu14, 31S2, 41 |
| 179 | Ti52, 62Zr10, 67Ni20, 16Cu14, 16S2, 38 |
| 180 | Ti51, 06Zr12, 58Ni19, 97Cu14, 02S2, 36 |
| 181 | Ti49, 41Zr14, 61Ni19, 77Cu13, 88S2, 33 |
| 182 | Ti47, 91Zr16, 45Ni19, 58Cu13, 75S2, 31 |
| 183 | Ti46, 31Zr18, 4Ni19, 38Cu13, 61S2, 29 |
| 184 | Ti44, 87Zr20, 17Ni19, 2Cu13, 49S2, 27 |
| 185 | Ti41, 95Zr23, 75Ni18, 84Cu13, 23S2, 23 |
| 186 | Ti39, 14Zr27, 19Ni18, 5Cu12, 99S2, 18 |
| 187 | Ti36, 43Zr30, 51Ni18, 16Cu12, 75S2, 15 |
| 188 | Ti33, 81Zr33, 72Ni17, 84Cu12, 53S2, 11 |
| 189 | Ti61, 33Zr0Ni21, 24Cu14, 92S2, 51 |
| 190 | Ti61, 22Zr0Ni18, 91Cu17, 37S2, 5 |
| 191 | Ti9, 75Zr56, 83Ni12, 3Cu16, 3Al3, 88S0, 94 |
| 192 | Ti9, 94Zr67, 07Ni11, 23Cu8, 68S3, 08 |
| 193 | Ti9, 98Zr67, 34Ni10, 87Cu8, 28S3, 53 |
| 194 | Ti9, 9Zr66, 81Ni11, 59Cu9, 08S2, 62 |
| 195 | Ti11, 3Zr54, 85Ni12, 46Cu16, 51Al3, 93S0, 95 |
| 196 | Ti11, 43Zr65, 62Ni11Cu8, 38S3, 57 |
| 197 | Ti13, 24Zr69, 41Ni13, 8S3, 55 |
| 198 | Ti14, 52Zr50, 74Ni12, 79Cu16, 95Al4, 03S0, 97 |
| 199 | Ti15, 56Zr31, 75Ni6, 99Cu44, 72S0, 98 |
| 200 | Ti17, 07Zr65, 05Ni14, 23S3, 65 |
| 201 | Ti17, 25Zr29, 35Ni7, 08Cu45, 32S1 |
| 202 | Ti18, 85Zr15, 96Ni7, 51Cu56, 63S1, 05 |
| 203 | Ti18, 99Zr26, 89Ni7, 18Cu45, 93S1, 01 |
| 204 | Ti20, 77Zr24, 36Ni7, 28Cu46, 57S1, 02 |
| 205 | Ti21, 13Zr60, 41Ni14, 68S3, 78 |
| 206 | Ti21, 34Zr16, 09Ni7, 57Cu53, 96S1, 04 |
| 207 | Ti22, 61Zr21, 76Ni7, 38Cu47, 22S1, 03 |
| 208 | Ti23, 87Zr16, 21Ni7, 63Cu51, 24S1, 05 |
| 209 | Ti24, 49Zr19, 09Ni7, 48Cu47, 89S1, 05 |
| 210 | Ti24, 52Zr43, 62Pd28, 35S3, 51 |
| 211 | Ti25, 01Zr16, 45Ni7, 74Cu48, 8S1, 06Si0, 94 |
| 212 | Ti25, 47Zr55, 47Ni15, 17S3, 89 |
| 213 | Ti25, 4Zr15, 7Ta5, 77Ni5, 52Cu46, 59S1, 02 |
| 214 | Ti25, 87Zr15, 95Ni7, 46Cu47, 47S3, 25 |
| 215 | Ti25, 95Zr16, 04Ni5, 64Cu47, 59In3, 74S1, 04 |
| 216 | Ti26, 01Zrl6, 08Ni5, 65Cu47, 7Ag3, 52S1, 04 |
| 217 | Ti26, 11Zr16, 14Mo3, 14Ni5, 67Cu47, 88S1, 06 |
| 218 | Ti26, 16Zr16, 13Ni7, 55Cu48, 01S2, 06 |
| 219 | Ti26, 34Zr16, 28Ni5, 72Cu48, 3Ga2, 3S1, 06 |
| 220 | Ti26, 43Zr16, 23Ni7, 61Cu48, 4S1, 33 |
| 221 | Ti26, 43Zr16, 34Ni5, 74Cu48, 47Co1, 95S1, 07 |
| 222 | Ti26, 43Zr16, 34Ni7, 59Cu48, 58S1, 06 |
| 223 | Ti26, 45Zr16, 31Ni7, 63Cu48, 54S1, 07 |
| 224 | Ti26, 47Zr16, 36Ni5, 75Cu48, 54Mn1, 82S1, 06 |
| 225 | Ti26, 47Zr16, 36Ni9, 55Cu46, 54S1, 08 |
| 226 | Ti26, 49Zr16, 37Ni5, 76Cu48, 58Cr1, 73S1, 07 |
| 227 | Ti26, 51Zr16, 39Ni7, 71Cu46, 5Mn1, 83S1, 06 |
| 228 | Ti26, 52Zr16, 39Ni11, 52Cu44, 51S1, 06 |
| 229 | Ti26, 54Zr16, 3Ni7, 67Cu48, 69S0, 8 |
| 230 | Ti26, 56Zr16, 42Ni13, 5Cu42, 46S1, 06 |
| 231 | Ti26, 75Zr16, 53Ni7, 78Cu46, 92S1, 08Si0, 94 |
| 232 | Ti26, 86Zr16, 6Ni5, 84Cu49, 26S1, 08B0, 36 |
| 233 | Ti28, 64Zr38, 53Pd29, 22S3, 61 |
| 234 | Ti29, 04Zr16, 47Ni7, 75Cu45, 67S1, 07 |
| 235 | Ti29, 42Zr49, 06Ni9, 02Cu6, 83Al1, 73S3, 94 |
| 236 | Ti29, 43Zr43, 47Ni9, 02Cu6, 84Sn7, 3S3, 94 |
| 237 | Ti29, 43Zr49, 07Ni9, 02Cu4, 88Sn3, 65S3, 95 |
| 238 | Ti29, 47Zr43, 53Ni10, 84Cu4, 89Sn7, 31S3, 96 |
| 239 | Ti29, 49Zr54, 8Ni11, 75S3, 96 |
| 240 | Ti29, 56Zr45, 06Ni9, 06Cu6, 87Sn5, 5S3, 95 |
| 241 | Ti29, 68Zr46, 67Ni9, 1Cu6, 9Sn3, 68S3, 97 |
| 242 | Ti29, 68Zr49, 49Ni9, 1Cu6, 9Al0, 85S3, 98 |
| 243 | Ti29, 6Zr45, 13Ni10, 89Cu4, 91Sn5, 51S3, 96 |
| 244 | Ti29, 73Zr46, 74Ni10, 93Cu4, 93Sn3, 69S3, 98 |
| 245 | Ti29, 79Zr52, 52Ni13, 7S3, 99 |
| 246 | Ti29, 81Zr48, 29Ni9, 14Cu6, 93Sn1, 85S3, 98 |
| 247 | Ti29, 85Zr48, 36Ni10, 98Cu4, 95Sn1, 85S4, 01 |
| 248 | Ti29, 85Zr49, 77Ni17, 38S3 |
| 249 | Ti29, 91Zr45, 61Nb4, 35Ni9, 17Cu6, 95S4, 01 |
| 250 | Ti29, 94Zr49, 92Ni9, 18Cu6, 95S4, 01 |
| 251 | Ti29, 95Zr49, 94Ni16, 71S3, 4 |
| 252 | Ti29, 97Zr49, 98Ni16, 54S3, 51 |
| 253 | Ti29, 98Zr50Ni11, 03Cu4, 98S4, 01 |
| 254 | Ti30, 03Zr50, 07Ni12, 89Cu2, 99S4, 02 |
| 255 | Ti30, 05Zr41, 52Nb8, 75Ni14, 59Cu3, 93 |
| 256 | Ti30, 07Zr45, 85Nb4, 38Ni15, 67S4, 03 |
| 257 | Ti30, 14Zr50, 25Ni12, 93Fe2, 64S4, 04 |
| 258 | Ti30, 16Zr50, 3Ni11, 1Fe4, 4S4, 04 |
| 259 | Ti30, 1Zr50, 19Ni15, 68S4, 03 |
| 260 | Ti30, 22Zr50, 2Ni14, 82S4, 5 |
| 261 | Ti30, 35Zr50, 61Ni13, 96S5, 08 |
| 262 | Ti30, 41Zr47, 81Ni17, 71S4, 07 |
| 263 | Ti30, 72Zr45, 38Ni19, 78S4, 12 |
| 264 | Ti31, 69Zr46, 6Ni7, 81Cu42, 82S1, 08 |
| 265 | Ti33, 02Zr33, 12Pd30, 14S3, 72 |
| 266 | Ti33, 81Zr33, 72Ni17, 84Cu11, 53S2, 1 |
| 267 | Ti34, 38Zr16, 73Ni7, 87Cu39, 93S1, 09 |
| 268 | Ti35, 05Zr44, 54Ni16, 24S4, 17 |
| 269 | Ti36, 43Zr30, 51Ni18, 16Cu12, 75S2, 15 |
| 270 | Ti37, 68Zr27, 36Pd31, 12S3, 84 |
| 271 | Ti39, 14Zr27, 19Ni18, 5Cu12, 99S2, 18 |
| 272 | Ti39, 4Zr37, 55Ni9, 66Cu7, 3Al1, 85S5, 24 |
| 273 | Ti40, 14Zr38, 25Ni9, 84Cu7, 46S4, 31 |
| 274 | Ti40, 37Zr38, 47Ni16, 83S4, 33 |
| 275 | Ti41, 95Zr23, 75Ni18, 84Cu13, 23S2, 23 |
| 276 | Ti42, 66Zr21, 21Pd32, 16S3, 97 |
| 277 | Ti44, 87Zr20, 17Ni19, 2Cu13, 49S2, 27 |

TABLE 1-continued

278 Ti45, 84Zr31, 77Ni18, 6S3, 79
279 Ti46, 09Zr31, 94Ni17, 47S4, 5
280 Ti47, 91Zr16, 45Ni19, 58Cu13, 75S2, 31
281 Ti47, 98Zr14, 63Pd33, 28S4, 11
282 Ti48, 4Zr24, 71Ni22, 26S4, 63
283 Ti49, 69Zr15, 15Pd25, 63Cu5, 28S4, 25
284 Ti50, 33Zr24, 81Ni20, 22S4, 64
285 Ti50, 62Zr20, 9Ta6, 38Ni17, 58S4, 52
286 Ti50, 69Zr16, 1Ni10, 36Cu7, 85Sn10, 48S4, 52
287 Ti50, 89Zr25, 08Ni18, 29S4, 71Si1, 03
288 Ti50, 93Zr17, 8Ni10, 41Cu7, 89Sn8, 42S4, 55
289 Ti50, 93Zr24, 27Ni10, 41Cu5, 63Sn4, 21S4, 55
290 Ti50, 99Zr16, 2Ni17, 72Sn10, 54S4, 55
291 Ti51, 02Zr17, 83Ni12, 51Cu5, 64Sn8, 44S4, 56
292 Ti51, 06Zr12, 58Ni19, 97Cu14, 02S2, 37
293 Ti51, 06Zr30, 81Ni13, 57S4, 56
294 Ti51, 18Zr19, 51Ni10, 46Cu7, 93Sn6, 35S4, 57
295 Ti51, 22Zr25, 24Ni18, 41S4, 73B0, 4
296 Ti51, 27Zr19, 54Ni12, 57Cu5, 67Sn6, 36S4, 59
297 Ti51, 44Zr21, 24Ni10, 51Cu7, 97Sn4, 25S4, 59
298 Ti51, 53Zr21, 28Ni12, 64Cu5, 7Sn4, 26S4, 59
299 Ti51, 66Zr27, 89Ni15, 84S4, 61
300 Ti51, 69Zr22, 99Ni10, 56Cu8, 01Sn2, 14S4, 61
301 Ti51, 69Zr24, 63Ni12, 89Cu6, 86S3, 93
302 Ti51, 77Zr24, 66Ni20, 1S3, 47
303 Ti51, 78Zr23, 03Ni12, 7Cu5, 73Sn2, 14S4, 62
304 Ti51, 82Zr21, 4Ni18In4, 14S4, 64
305 Ti51, 83Zr24, 69Ni16, 1Cu3, 44S3, 94
306 Ti51, 95Zr21, 45Ni18, 05Ag3, 9S4, 65
307 Ti51, 95Zr24, 75Ni10, 62Cu8, 05S4, 63
308 Ti51, 97Zr24, 76Ni19, 33S3, 94
309 Ti51, 9Zr19, 78Nb5, 04Ni10, 61Cu8, 04S4, 63
310 Ti52, 02Zr24, 78Ni19, 13S4, 07
311 Ti52, 04Zr24, 79Ni12, 76Cu5, 76S4, 65
312 Ti52, 13Zr24, 84Ni14, 92Cu3, 46S4, 65
313 Ti52, 17Zr14, 91Nb10, 13Ni18, 13S4, 66
314 Ti52, 18Zr21, 55Mo3, 49Ni18, 13S4, 65
315 Ti52, 22Zr19, 9Nb5, 07Ni18, 14S4, 67
316 Ti52, 27Zr24, 9Ni18, 16S4, 67
317 Ti52, 35Zr24, 94Ni14, 98Fe3, 05S4, 68
318 Ti52, 4Zr24, 97Ni12, 85Fe5, 09S4, 69
319 Ti52, 52Zr25, 02Ni17, 17S5, 29
320 Ti52, 68Zr21, 75Ni18, 3Ga2, 56S4, 71
321 Ti52, 78Zr25, 15Ni16, 18S5, 89
322 Ti52, 9Zr21, 84Ni20, 54S4, 72
323 Ti53, 54Zr18, 71Ni22, 98S4, 77
324 Ti53, 5Zr22, 09Ni18, 59S4, 77Si1, 05
325 Ti53, 68Zr7, 58Pd34, 48S4, 26
326 Ti53, 85Zr22, 23Ni18, 71S4, 8B0, 41
327 Ti54, 22Zr25Ni16, 09S4, 69
328 Ti54, 35Zr8, 56Ni20, 38Cu14, 31S2, 4
329 Ti55, 66Zr7, 86Pd26, 58Cu5, 47S4, 43
330 Ti56, 03Ni17, 97Sn21, 38S4, 62
331 Ti56, 2Zr25, 1Ni14S4, 7
332 Ti56, 33Pd39, 36S4, 31
333 Ti56, 89Ni20, 98Cu19, 65S2, 48
334 Ti57, 1Ni25, 62Cu14, 79S2, 49
335 Ti57, 77Zr4, 37Ni20, 8Cu14, 61S2, 45
336 Ti58, 28Zr17, 09Ni13, 41Cu7, 14S4, 08
337 Ti58, 41Nb17, 44Ni20, 05S4, 1
338 Ti58, 44Zr17, 13Ni16, 76Cu3, 58S4, 09
339 Ti58, 57Zr17, 17Ni11, 05Cu8, 37S4, 84
340 Ti58, 6Ni25, 46Cu14, 7S1, 24
341 Ti58, 6Zr17, 18Ni20, 12S4, 1
342 Ti58, 95Zr17, 28Ni18, 9S4, 87
343 Ti59, 1Ni21, 11Cu17, 3S2, 49
344 Ti59, 81Pd35, 77S4, 42
345 Ti60, 7Ni23, 29Cu14, 76S1, 25
346 Ti60, 81Ni25, 62Cu12, 33S1, 24
347 Ti61, 01Ni22, 27Cu14, 84S1, 88
348 Ti61, 08Pd33, 48S5, 44
349 Ti61, 17Ni21, 76Cu14, 88S2, 19
350 Ti61, 1Ni16, 59Cu19, 81S2, 5
351 Ti61, 22Ni18, 91Cu17, 37S2, 5
352 Ti61, 33Ni21, 24Cu14, 92S2, 51
353 Ti61, 49Ni20, 72Cu14, 96S2, 83
354 Ti61, 57Ni25, 93Cu9, 98S2, 52
355 Ti61, 82Ni19, 67Cu15, 03S3, 48
356 Ti61, 98Ni19, 14Cu15, 07S3, 81
357 Ti62, 64Ni17Cu15, 23S5, 13
358 Ti62, 97Ni15, 91Cu15, 32S5, 8
359 Ti63, 48Pd31, 99S4, 53
360 Ti64, 04Ni11, 22Cu8, 5Sn11, 34S4, 9
361 Ti64, 11Pd30, 88S5, 01
362 Ti64, 15Ni13, 49Cu6, 08Sn11, 36S4, 92
363 Ti64, 27Ni15, 76Cu3, 66Sn11, 39S4, 92
364 Ti64, 39Ni18, 05Cu1, 22Sn11, 41S4, 93
365 Ti64, 45Ni19, 19Sn11, 43S4, 94
366 Ti65, 76Zr8, 95Ni11, 52Cu8, 73S5, 04
367 Ti65, 89Zr8, 97Ni13, 85Cu6, 25S5, 04
368 Ti66, 01Zr8, 99Ni16, 19Cu3, 76S5, 05
369 Ti66, 14Zr9Ni18, 54Cu1, 25S5, 07
370 Ti66, 27Pd23, 57Ni5, 42S4, 74
371 Ti66, 2Zr9, 01Ni19, 71S5, 08
372 Ti68, 03Ni27, 41S4, 56
373 Ti68, 07Pd18, 16Ni8, 9S4, 87
374 Ti68, 77Nb5, 56Ni21, 32S4, 35
375 Ti68, 84Zr5, 47Ni21, 34S4, 35
376 Ti69, 11Ni19, 87Sn5, 91S5, 11
377 Ti69, 97Pd12, 45Ni12, 58S5
378 Ti70, 05Ni26, 78S3, 17
379 Ti70, 54V3, 13Ni21, 87S4, 46
380 Ti70, 61Ni15, 01Sn9, 34S5, 04
381 Ti70, 78Ni24, 78S4, 44
382 Ti71, 63Ni22, 41S5, 96
383 Ti71, 6Ni22, 19Al1, 68S4, 53
384 Ti71, 96Ni11, 77Cu6, 37Sn4, 76S5, 14
385 Ti71, 98Nb1, 89Ni21, 71S4, 42
386 Ti71, 98Pd6, 4Ni16, 48S5, 14
387 Ti71Ni17, 64Sn7, 04S4, 32
388 Ti72, 07Ni20, 3Sn2, 42S5, 21
389 Ti72, 32Ni17, 73Sn4, 78S5, 17
390 Ti72, 59V1, 04Ni21, 89S4, 48
391 Ti72, 92Ni10, 13Cu12, 52S4, 43
392 Ti72, 95Ni22Al0, 56S4, 49
393 Ti72, 96Ni21, 76S5, 28
394 Ti72Zr1, 85Ni21, 71S4, 44
395 Ti73, 01Ni2, 39Cu19, 39S5, 21
396 Ti73, 16Ni4, 78Cu16, 83S5, 23
397 Ti73, 19Ni14, 6Cu7, 77S4, 44
398 Ti73, 22Ni22, 98S3, 8
399 Ti73, 2Ni19, 15Sn2, 42S5, 23
400 Ti73, 3Ni7, 19Cu14, 27S5, 24
401 Ti73, 45Ni9, 61Cu11, 7S5, 24
402 Ti73, 4Ni18, 24Cu3, 9S4, 46
403 Ti73, 55Ni20, 68Cu1, 3S4, 47
404 Ti73, 59Ni12, 03Cu9, 12S5, 26
405 Ti73, 61Ni18, 29Co3, 63S4, 47
406 Ti73, 62Ni20, 7Co1, 21S4, 47
407 Ti73, 62Ni21, 91S4, 47
408 Ti73, 74Ni14, 47Cu6, 53S5, 26
409 Ti73, 89Ni16, 91Cu3, 92S5, 28
410 Ti74, 11Ni20, 6S5, 29
411 Ti74, 24Ni16, 99Fe3, 46S5, 31
412 Ti74, 37Ni13, 37Fe6, 94S5, 32
413 Ti74, 72Ni18, 94S6, 34
414 Ti75, 26Ni19, 43S5, 31
415 Ti75, 75Ni20, 97S3, 28
416 Ti76, 5Ni19S4, 5
417 Ti77, 44Ni16, 54S6, 02
418 Zr36, 16Cu51, 38Ag11, 6S0, 86
419 Zr66, 77Hf3, 16Nb2, 11Cu23, 79Fe0, 14Al3, 65S0, 21C0, 04O0, 11N0, 02
420 Zr67, 06Hf3, 18Nb1, 81Cu23, 79Fe0, 14Al3, 65S0, 21C0, 04O0, 11N0, 02
421 Zr69, 1Nb1, 79Cu23, 38Al3, 58S2, 15
422 Zr69, 41Nb1, 79Cu23, 48Al3, 6S1, 72
423 Zr69, 72Nb1, 8Cu23, 58Al3, 62S1, 28
423 Zr70, 03Nb1, 8Cu23, 69Al3, 63S0, 85
425 Zr70, 32Nb1, 83Cu23, 78Al3, 65S0, 42
426 Zr70, 47Nb1, 81Cu23, 85Al3, 66S0, 21
427 Zr72, 29Cu23, 85Al3, 65S0, 21
428 Ti29, 3009Zr47, 0547Hf2, 2275Cu17, 0260(Fe, Cr)0, 1920O0, 1530N0, 0212H0, 0069C0, 0484S3, 9690 and Pb0.0004 as a metallic trace impurity All publications of any type cited herein are hereby included with their entire content in this description through any reference thereto.

The invention claimed is:

1. A sulfurous metallic glass forming Zr alloy having a formula:

(1)

in which:
a=approx. 30%-approx. 90% by weight,
b=0%-approx. 68% by weight, and
a+b=approx. 30%-approx. 97% by weight,
wherein
A is one or more elements selected from the group consisting of lanthanide elements and yttrium and a1/a=0-approx. 1/10,
c=0%-approx. 65% by weight,
d=0%-approx. 15% by weight,
e=0%-approx. 15% by weight,
f=0%-approx. 15% by weight,
g=0%-approx. 23% by weight,
h=0%-approx. 1% by weight,
i=0%-approx. 3.5% by weight,
j=0%-approx. 0.20% by weight,
wherein, when b=0%, at least one of c and e>0%,
$Fe_{(1)}$ and $Fe_{(2)}$ each stand for Fe, wherein $Fe_{(2)}$ is only present when $Fe_{(1)}$ is not x=approx. 0.21%-approx. 9% by weight, and
x1/x≥ approx. 1/10 to approx. 1.

2. The alloy according to claim 1, characterized in that it exhibits the formula (Ti, Zr, Nb, Hf, $Fe_{(1)}$,$A_{a1}$)$_a$$Pd_b$(Cu,Ni)$_c$ (V,Mo,Ta,W)$_d$(Co,Cr,$Fe_{(2)}$)$_e$ (Mn,Al,In,Ga,Ag,Si,Ge)$_f$ $Sn_g$$Be_h$(B,C)$_i$(O, H, N)$_j$(P, $S_{x1}$)$_x$ in which
a=approx. 30%-approx. 90% by weight
b=0%-approx. 40% by weight
x=approx. 0.21%-approx. 9% by weight, and
at least one of b, c, and e>0.

3. The alloy according to claim 2, characterized in that it exhibits the formula (Ti, Zr, Nb)$_a$ $Pd_b$ (Cu, Ni)$_c$ $Al_f$ $Sn_g$ (P,$S_{x1}$)$_x$, in which
a=approx. 30%-approx. 90% by weight, b=0%-approx. 40% by weight, a+b=approx. 30%-approx. 97% by weight, and at least one of b and c>0% by weight, and x1, x.

4. The alloy according to claim 1, characterized in that x1/x=approx. 1.

5. The alloy according to claim 1, characterized in that the alloy is at least approx. 50% by volume amorphous at a thickness of ≥ approx. 20 µm.

6. A mold produced from an amorphous, partially amorphous, or crystalline alloy according to claim 1.

7. The alloy according to claim 1, wherein x1/x=approx. 1 and x=approx. 0.21%-approx. 1% by weight, the alloy contains $Fe_1$, Ni and Al and is at least approx. 50% by volume amorphous.

8. A method for a melting metallurgical production of an alloy according to claim 1, characterized in that
one or more of the elements Fe, Pd, Ni, Cr, Cu and Co are individually heated and alloyed in a container with sulfur,
the resulting alloy is subjected to a flux process comprising purifying with $B_2O_3$ to form a purified alloy, and excess $B_2O_3$ and non-sulfide impurities are separated from the resulting sulfur, and
the purified alloy is melted and alloyed in an oven or a container in argon with the remaining elements of the alloy in a highly purified form.

9. The method according to claim 8, further comprising fast cooling using a cooling mold process, or a powdering process.

10. The method according to claim 8, characterized in that the container for producing the alloy is a quartz container.

11. The method according to claim 8, characterized in that the oven is an electric arc furnace.

12. The method according to claim 8, wherein the elements are also individually heated and alloyed with phosphorus in a separate container.

13. The method according to claim 12, wherein non-phosphide impurities are separated from a resulting phosphorus master alloy.

14. The alloy according to claim 8, wherein the purified alloy is melted and alloyed with at least one element selected from the group consisting of Fe, Pd, Ni, Cr, Cu and Co.

* * * * *